United States Patent
Mooney et al.

(10) Patent No.: US 9,235,606 B1
(45) Date of Patent: Jan. 12, 2016

(54) SIMPLIFIED DATABASE/LOG BACKUP AND RESTORE

(71) Applicant: EMC Corporation, Hopkinton, MA (US)

(72) Inventors: James A. Mooney, Duvall, WA (US); Brian Bishop, Redmond, WA (US); Jerzy Gruszka, Lacey, WA (US)

(73) Assignee: EMC Corporation, Hopkinton, MA (US)

( * ) Notice: Subject to any disclaimer, the term of this patent is extended or adjusted under 35 U.S.C. 154(b) by 87 days.

(21) Appl. No.: 13/723,931

(22) Filed: Dec. 21, 2012

(51) Int. Cl.
*G06F 17/30* (2006.01)

(52) U.S. Cl.
CPC .................. *G06F 17/30289* (2013.01)

(58) Field of Classification Search
None
See application file for complete search history.

(56) References Cited

U.S. PATENT DOCUMENTS

| | | | |
|---|---|---|---|
| 7,797,279 B1* | 9/2010 | Starling et al. | 707/641 |
| 2006/0123020 A1* | 6/2006 | Bybee et al. | 707/100 |
| 2011/0078118 A1* | 3/2011 | Kushwah | 707/646 |
| 2012/0284232 A1* | 11/2012 | Fiske | 707/646 |

* cited by examiner

*Primary Examiner* — Robert Beausoliel, Jr.
*Assistant Examiner* — Hau H Hoang
(74) *Attorney, Agent, or Firm* — Van Pelt, Yi & James LLP

(57) ABSTRACT

A set of objects associated with an incremental backup is determined where the set of objects includes one or more full backup objects associated with a full backup from which the incremental backup depends. A backup is performed using the set of objects, including by setting one or more timestamps associated with the one or more full backup objects to a time later than the full backup.

14 Claims, 8 Drawing Sheets

SIMPLIFIED DATABASE/LOG BACKUP AND RESTORE

BACKGROUND OF THE INVENTION

Incremental backups are attractive because they tend to use less storage and/or processing time than a full backup. Although incremental backups are able to be restored for some period of time, it would be desirable to extend this period of time. Extending the period of time during which an incremental backup is available reduces the likelihood that a particular incremental backup is desired but is unavailable. Furthermore, if a new technique which extended the period of time during which an incremental backup is available was able to do so without requiring changes to some component or device, it would be desirable.

BRIEF DESCRIPTION OF THE DRAWINGS

Various embodiments of the invention are disclosed in the following detailed description and the accompanying drawings.

DETAILED DESCRIPTION

Figure 1:
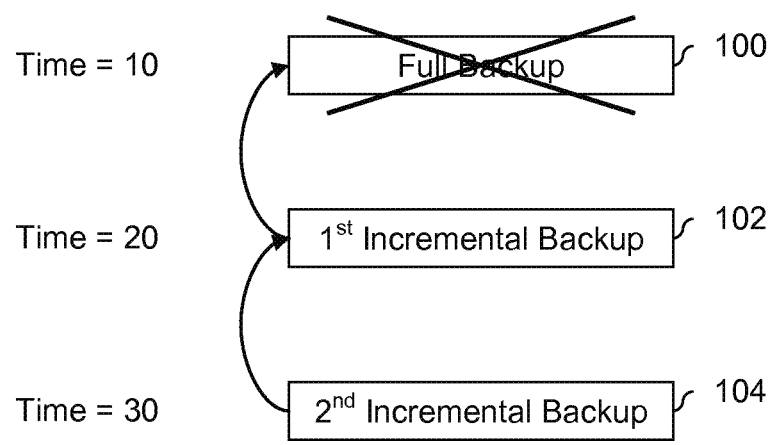
FIG. 1 is a diagram showing an embodiment of a chain of dependent backups.

The invention can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for performing incremental backups is described herein. A set of objects associated with an incremental backup, including one or more full backup objects associated with a full backup from which the incremental backup depends, is determined. In some cases, there is an intervening incremental backup in a chain of backups and the set of objects determined includes an intervening incremental backup object associated with an intervening incremental backup. A backup which uses the set of objects is initiated. For example, a backup processor may instruct some backup agent running on a protected device to perform a backup. In some embodiments, all objects associated with all previous, dependent backups from which a given incremental backup depends are used or included in that incremental backup. As part of the backup, one or more timestamps associated with the one or more full backup objects are set to a time later than the full backup. Setting the timestamp(s) to a time later than the full backup postpones or delays expiration of the full backup. If there is an intervening incremental backup in the chain, then one or more timestamps associated with the one or more intervening incremental backup objects may be set to a time later than that of the particular incremental backup. This, in turn, postpones or delays expiration of that intervening incremental backup for which timestamps are set to a later time. Extending the period over which a full or intervening incremental backup is available causes a dependent incremental backup (e.g., at the end of the chain) to also have its available period extended.

FIG. 1 is a diagram showing an embodiment of a chain of dependent backups.

In the example shown, full backup 100 is performed at time 10. Later, at time 20, a first incremental backup (102) is performed which depends from full backup 100. After that, a second incremental backup (104) is performed at time 30; second incremental backup 104 depends from full backup 100 as well as first incremental backup 102.

A backup system (not shown) records the times at which each of the backups is performed. For the chain of backups shown, a backup system records timestamps of 10, 20, and 30, respectively, for backups 100, 102, and 104. Eventually, full backup 100 expires (e.g., after a specified amount of time has elapsed) and becomes eligible for deletion by the backup system. Full backup 100 is then deleted by the backup system (e.g., immediately upon expiration or at some time after expiration when space is needed). In some embodiments, a backup system has a configurable setting via which a user is able to specify an expiration time (e.g., 1 week, 1 month, 1 year, etc.).

Once full backup 100 is deleted by the backup system, neither first incremental backup 102 nor second incremental backup 104 can be restored. For an incremental backup to be restored, all backups in a chain from which the desired incremental backup depends must be available. The following figures describe embodiments of an incremental backup technique which delays deletion of a full or intervening incremental backup in a chain of backups (e.g., delays deletion of full backup 100 and first incremental backup 102).

Figure 2:
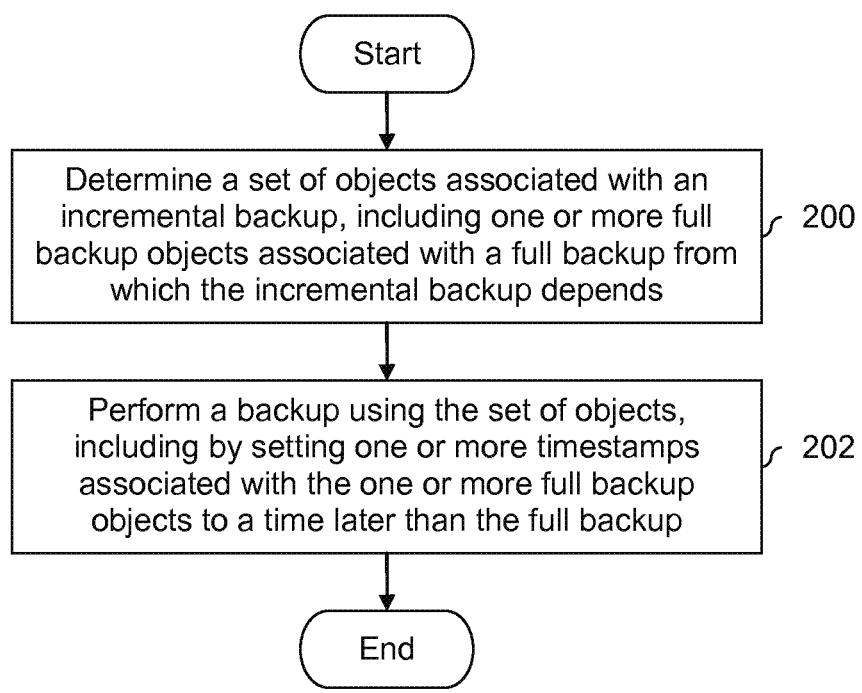
FIG. 2 is a flowchart illustrating an embodiment of a process for performing an incremental backup.

FIG. 2 is a flowchart illustrating an embodiment of a process for performing an incremental backup. At 200, a set of objects associated with an incremental backup, including one or more full backup objects associated with a full backup from which the incremental backup depends, is determined. In some embodiments, step 200 is performed by a backup agent running on a protected device. In FIG. 1, suppose an incremental backup is being performed for second incremental backup 104. An exemplary set of objects determined at 200 for second incremental backup 104 includes objects associated with full backup 100. For example, this may be an object which last changed prior to time 10. In some embodiments, a full backup object included in an incremental backup no longer exists on a protected or production device and the full backup object included in the incremental backup is the version that existed at the time of the full backup (e.g., a backup copy on some backup storage). In some embodiments, a full backup object has changed and the version of the full backup object included in the incremental backup is the version that existed at the time of the full backup, not the current version or state of the object. In this particular example of second incremental backup 104, the set of objects determined at 200 also includes intervening incremental backup objects associated with first incremental backup 102. For example, this may be an object which last changed between time 10 and time 20 (i.e., between full backup 100 and first incremental backup 102). As described above, in some embodiments, an intervening incremental backup object may (in some cases) no longer exist on a production or protected device, or the object may have changed and the version included in an incremental backup is the version that existed at the time of that intervening incremental backup.

At 202, a backup is performed using the set of objects, including by setting one or more timestamps associated with the one or more full backup objects to a time later than the full backup. In FIG. 1, timestamps for full backup objects associated with full backups 102 are changed from 10 to 30. In addition to that, timestamps for intervening incremental backup objects associated with first incremental backup 102 are changed from 20 to 30. It should be noted that other incremental backup techniques do not necessarily use a full backup object or intervening incremental backup object. The updated timestamp(s) cause expiration of the full backup 100 and first intervening incremental backup 102 to be delayed, which in turn extends the period during which second incremental backup 104 can be restored. In some embodiments, the timestamps are managed or kept by a backup processor (e.g., on a backup device different than a protected device). Some other benefits to this incremental backup technique are described in further detail below.

Figure 3A:
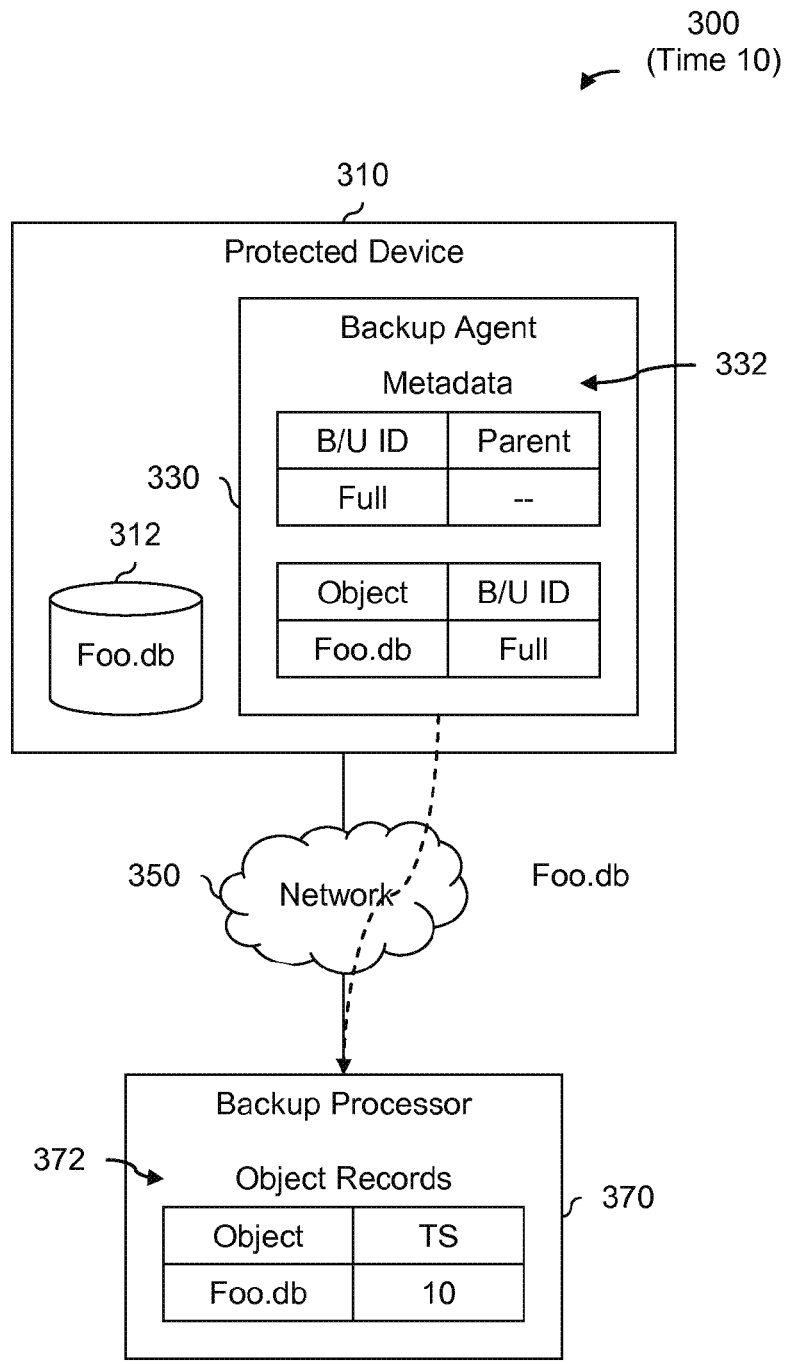
FIG. 3A is a diagram showing an embodiment of a backup system performing a full backup at a first point in time.

FIG. 3A is a diagram showing an embodiment of a backup system performing a full backup at a first point in time. In this example and other embodiments shown herein, an object associated with a backup (e.g., full or incremental) comprises a database or a log. For example, some database applications make changes to a database by recording the change in a log, as opposed to directly performing the change on the database. In some cases, making a change directly to a database is time consuming and/or a database is locked at the time of the change. Periodically, the changes captured in the logs are applied to and/or merged with the database.

Protected device 310 at time 10 includes database 312 (i.e., foo.db). In this example, backup agent 330 performs at least some of the incremental backup steps described herein and one example of backup agent 330 is an Avamar Exchange VSS Plug-in. Another example of backup agent 33 is Avamar Hyper-V Plug-In. In some embodiments, backup processor 370 is an Avamar Server appliance where backups actually reside. Backup processor 370 instructs backup agent 330 (via network 350) to perform a backup. In this example, backup agent determines that the full backup it was instructed to perform should be performed using foo.db and a copy of foo.db is exchanged between backup agent 330 and backup processor 370.

Backup processor 370 stores foo.db (not shown) in storage. Foo.db is an example of a full backup object. It should be noted that in this figure, a backed up copy of foo.db 312 (e.g., on some backup storage) is not shown herein, but that does not necessarily mean it does not exist. As part of the backup process, backup processor 370 stores in object records 372 a record of the objects associated with the backup (i.e., foo.db) and an associated timestamp (i.e., a time of 10).

Backup agent 330 manages metadata 332 and records the parent of the current backup being performed (i.e., "Full and --") and objects associated with the current backup (i.e., "Foo.db and Full") in metadata 332. Metadata 332 may be used for a variety of purposes, including knowing more readily what objects are associated with a full or intervening backup when it is time to perform a later, dependent incremental backup. This may be faster than having to re-determine (e.g., in real time) the entire set of objects with which to provide to backup processor 370. Some other uses of metadata 332 are described in further detail below. Although this example shows metadata 332 tracking which objects are associated with which backups (bottom table) and the chain of backups (top table), in some embodiments metadata is organized differently. For example, all objects included in any previous backup (e.g., full or intervening incremental) are stored together in one group without distinguishing or recording what backup a particular object is associated with. In some cases, the system may only care if a full backup object or an intervening incremental backup is missing, and does not care at what link in a chain of backups the missing object is associated with.

In various embodiments, network 350 includes a variety of network technologies and/or protocols. Some examples of network 350 include a storage area network (SAN), a local area network (LAN), etc.

Figure 3B:
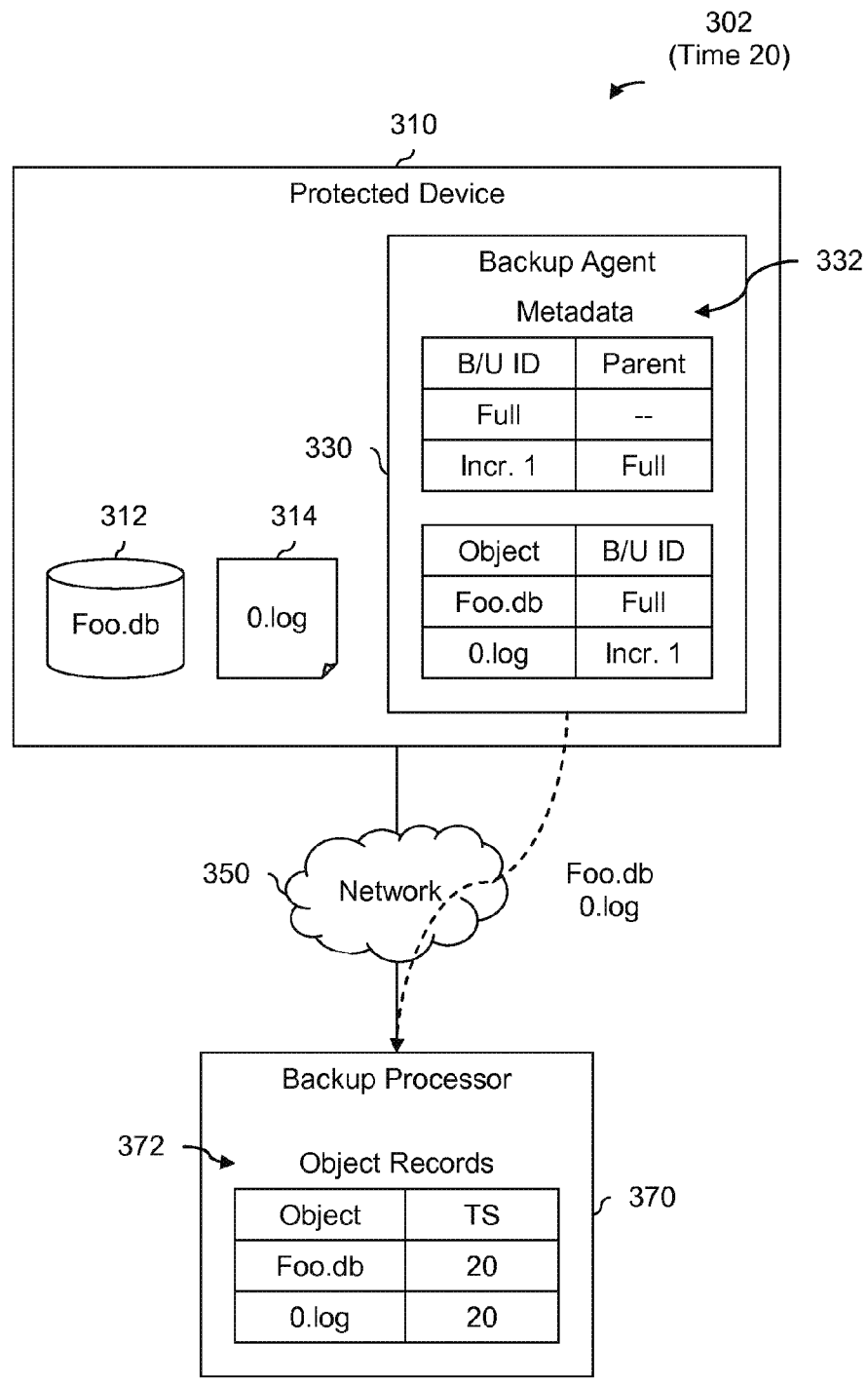
FIG. 3B is a diagram showing an embodiment of a backup system performing a first incremental backup at a second point in time.

FIG. 3B is a diagram showing an embodiment of a backup system performing a first incremental backup at a second point in time. FIG. 3B continues the example of FIG. 3A and shows the exemplary system at time 20. In diagram 302, an application (e.g., a database application) has created log 314 (i.e., 0.log) associated with database 312. For example, log 314 may capture changes to database 312 and the current state of the system is comprised of database 312 as modified by log 314.

Backup agent 330 determines a set of objects associated with the backup at time 20, in this example foo.db and 0.log, even though database 312 may not necessarily have changed since diagram 300 at time 10. In this example, metadata 332 is used in determining the set of objects associated with the incremental backup at time 20 (e.g., it is recorded in metadata 332 that the object foo.db is associated with the prior full backup and that there are no parent backups from which that full backup depends). Backup processor 372 is instructed by backup agent 330 to perform a backup using foo.db and 0.log. As part of the backup, backup processor 370 updates object records 372 so that foo.db has a timestamp of 20; 0.log is added to object records 372 with a timestamp of 20.

In this example, backup processor 370 uses the timestamps in object records 372 to determine when objects and/or backups have expired and are thus eligible for deletion. For example, backup processor 370 takes the difference between a current time and a stored timestamp and if the difference is greater than a threshold, that object has expired. Changing the timestamp of foo.db from 10 to 20 in object records 372 therefore resets or delays expiration of that object and the associated full backup. For example, if an object or backup expires after 30 time units, foo.db (at time 20) would be ⅓ of the way to expiring if the timestamp was still set to 10. By indicating to backup processor 370 that the first incremental backup includes foo.db, the resulting update of the associated timestamp from 10 to 20 delays expiration of that object and the associated full backup.

One advantage to the technique described herein is that it takes advantages of existing features or capabilities of backup processor 370. It is not necessary, in other words, for changes to be made to backup processor 370. Adding new features to a backup processor and installing a new version is expensive and time consuming, so being able to use a backup processor already in place is desirable.

Figure 3C:
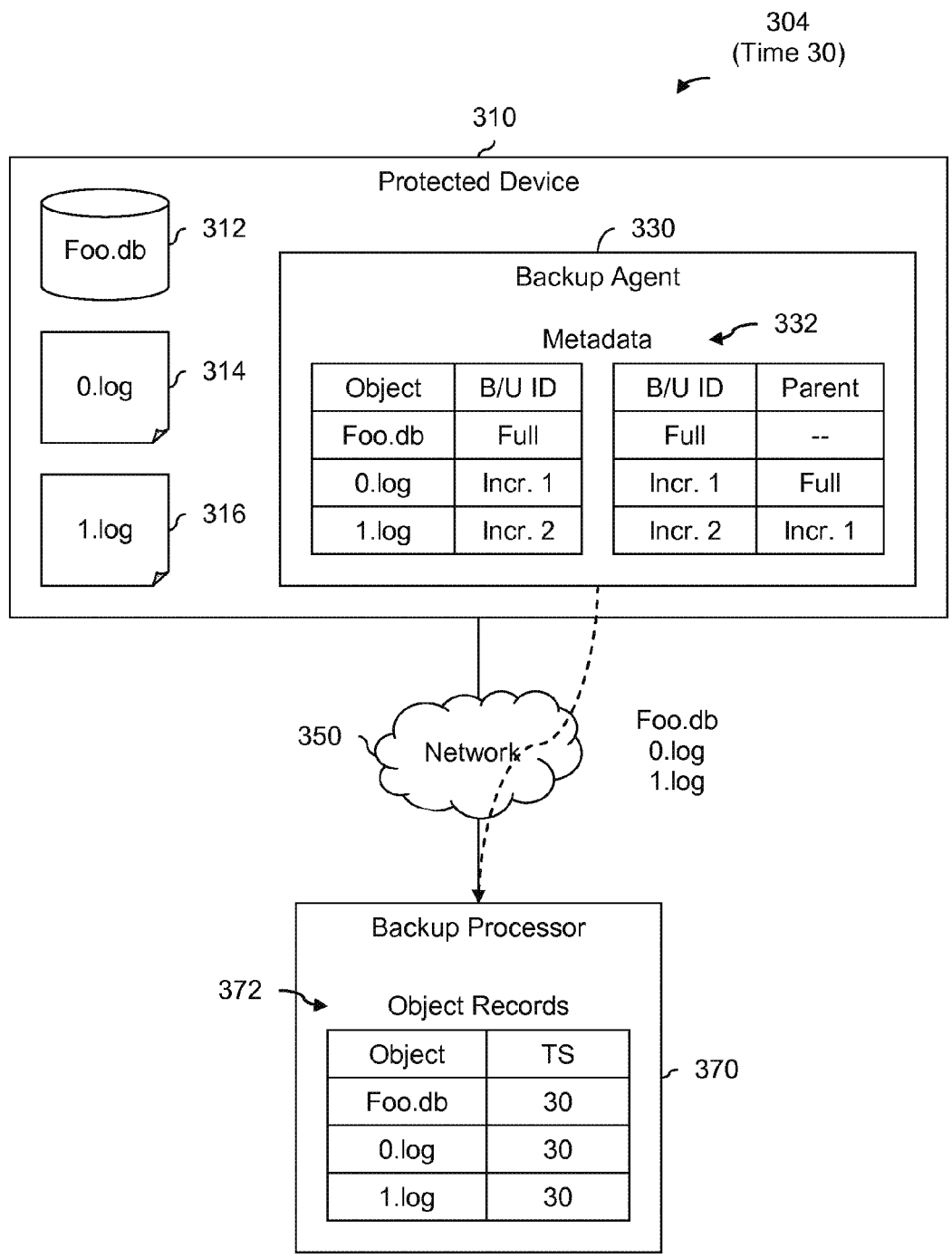
FIG. 3C is a diagram showing an embodiment of a backup system performing a second incremental backup at a third point in time.

FIG. 3C is a diagram showing an embodiment of a backup system performing a second incremental backup at a third point in time. FIG. 3C continues the example of FIG. 3B and shows the exemplary system at time 30. In diagram 304 at time 30, log 316 has been added to protected device 310. Backup processor 370 instructs backup agent 330 to perform an incremental backup; in response to the instruction, backup agent 330 determines that the incremental backup should be performed using foo.db, 0.log, and 1.log. In contrast, some other backup agents (e.g., configured to perform backups in some other manner) would not include full backup object (e.g., foo.db) nor an incremental intervening backup object (e.g., 0.log) when instructed to perform the same incremental backup shown herein. Backup agent 330 determines this set of objects using the information recorded in metadata 332 (e.g., to determine intervening incremental backup objects associated with intervening incremental backups and full backup objects associated with a full backup from which the current incremental backup depends). As part of the backup, the timestamps associated with foo.db, 0.log, and 1.log in object records 372 are set to 30. This delays expiration of the full backup (at time 10 shown in FIG. 3A), the first incremental backup (at time 20 shown in FIG. 3B), and objects associated with those backups. As shown in this example, in at least some embodiments, in incremental backup uses or includes an object associated with an intervening incremental backup (e.g., 0.log).

Setting the timestamps in object records 372 to 30 (e.g., as a result of use or inclusion of foo.db, 0.log, and 1.log in the incremental backup) causes expiration of the full backup at time 10 (for the second time) and the first incremental backup at time 20 to be delayed. For example, if the system shown in diagram 304 progressed to time 40, the object foo.db and the full backup associated with it would expire (for an expiration threshold of 30) if the timestamp associated with foo.db in object records 372 was still set to 10 (as it originally was in diagram 300) as opposed to 30.

In some embodiments, a backup includes a snapview. For example, in Avamar system, a backup includes a set of files and associated metadata. The metadata (at least in this example) includes snapviews. A snapview is an index containing references to the files in a backup. In one example of how snapviews are used with the incremental backup technique described herein: a snapview includes references to the one, immediately-prior backup's files in addition to those contained in the current backup. As a result, a chain of backups back to an original, full backup does not need to be crawled, since all files in the chain are already referenced in the single immediately-previous backup.

Performing an incremental backup which uses or includes one or more full backup objects (and, if appropriate intervening incremental backup objects) has benefits in addition to delaying expiration. For example, in other systems where an incremental backup is performed without one or more full backup objects, restoration is a multi-step process. Using an Avamar system as an example, first, an Avamar server's backup history is searched for the most recent full backup of the desired components; restoration of that full backup is then performed. Then, all intervening incremental backups are searched for and restored, one by one, up to the desired point in time or state. This process is unnecessarily repetitive and time consuming. For example, since the same log can be present in more than one backup (e.g., a full backup and an intervening backup, or a first intervening backup and a second intervening backup), sometimes the same file is restored multiple times, wasting time and network bandwidth.

Since the backup technique described herein includes full backup objects even during incremental backups (and, where applicable, intervening incremental backup objects), restoration is reduced to a single step. Instead of searching for and restoring (e.g. individually) all of the backups from which a desired incremental backup depends and/or objects related to those backups, restoration is performed in a single logical operation. The ability to perform a single step restore is enabled by the use or inclusion of all objects associated with all backups from which an incremental backup depends and certain components, such as backup processor 370, are not required to be changed.

In some situations, two objects in a set of objects determined at 200 in FIG. 2 have the same name and a backup processor will fail if two or more objects have the same name. This is referred to as name collision. The following figures describe an environment in which a name collision may occur and an embodiment of a process for avoiding name collision.

Figure 4:
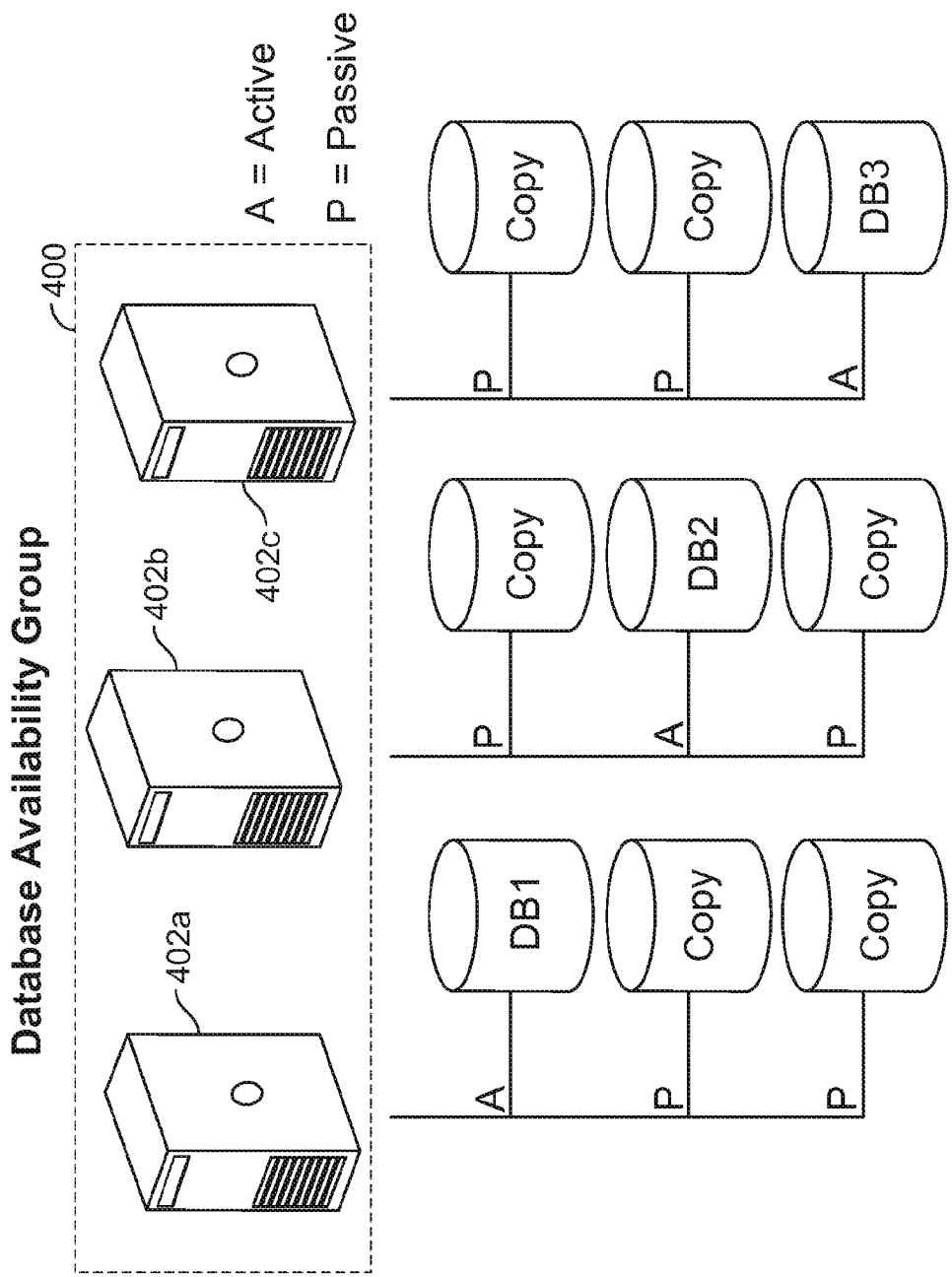
FIG. 4 is a diagram showing an embodiment of a federated system.

FIG. 4 is a diagram showing an embodiment of a federated system. In the example shown, database availability group 400 includes servers 402a-402c. A database availability group may sometimes be referred to as a cluster. Servers 402a-402c are peers of each other and host all or subsets of the same set of databases. In an example of the former, DB1, DB2, and DB3 (on servers 402a-402c, respectively) may be the same database. In an example of the latter, the three databases may be non-overlapping databases (e.g., DB1 is the accounting database, DB2 is the research and development database, and DB3 is the manufacturing database).

In this example, regardless of how many servers are hosting a given database, only one database copy is designated as active at any given time; the rest are considered or designated as passive copies and are synchronized with the active copy using a replication service (any appropriate replication service may be used). In the event a cluster management service detects that an active database copy has gone offline, one of the related passive copies is promoted to active status. As shown herein, a server is capable of hosting both active and passive databases simultaneously.

In this example, one of servers 402a-402c in cluster 400 is designated as the primary node. Selection of the primary node is (at least in some embodiments) arbitrary and may be based upon (for example) network addresses (e.g., IP addresses), serial numbers, last time since down (put another way, how long a server has been "up"), and so on. In the event a primary node goes down, another server becomes or is designated to be the primary node.

An Avamar agent on the primary node (e.g., one of servers 402a-402c) accepts work orders from an Avamar server and determines which nodes are hosting passive copies of the different databases. The primary node divides a given work order into work order subsets and sends them to the nodes which are hosting passive copies. Once results and/or responses are returned to the primary node, the received information is marshaled from those servers into one overall snapview.

As a result of the distributed and/or duplicate nature of a federated system, a name collision may occur where two or more backup objects have the same name but are intended to refer to two different things. For example, two databases may have the same name or two log files have the same name, but they may be logically distinct. Multiple files having the same name on different devices sometimes occurs in federated systems; this is acceptable behavior on the part of the federated system. In some embodiments, a primary node performs a uniquification process, for example to prevent a name collisions. In some embodiments, primary node performs a uniquification process after the nodes (to which work order subsets were sent) return their results but before performing an incremental backup in the manner described herein. The following figure describes one embodiment of a uniquification process. The process described below is merely exemplary and any appropriate uniquification process may be used.

Figure 5:
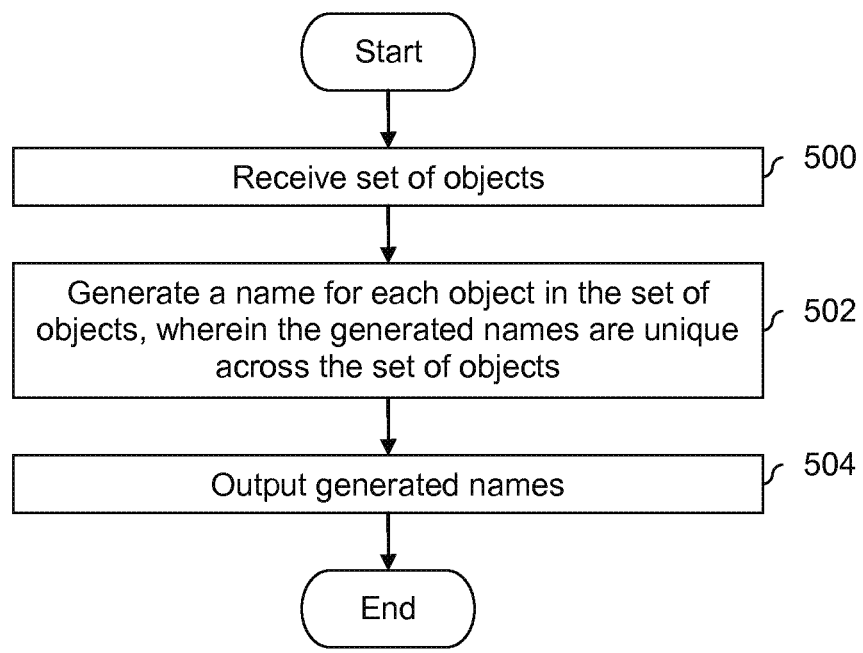
FIG. 5 is a flowchart illustrating an embodiment of an uniquification process for generating names that do not collide.

FIG. 5 is a flowchart illustrating an embodiment of an uniquification process for generating names that do not collide. In some embodiments, determining a set of objects at 200 in FIG. 2 includes using the example process shown in FIG. 5. This ensures, for example, that the names of objects passed to and/or used by a backup processor are unique and do not collide. In some embodiments, FIG. 5 is performed by a primary node in a database availability group (e.g., associated with a federated system). Since the primary node sees all of the results farmed out to other nodes, performing uniquification at the primary node may be a convenient or good location at which to resolve name collision.

At 500, a set of objects is received. For example, the names of the databases and logs on various devices may be received. In some embodiments, the names of objects include paths. For example:

C:\Program Files\Application\DataFolder_1\first.db (on a Device 1)
C:\Program Files\Application\DataFolder_1\10.log (on a Device 1)
C:\Program Files\Application\DataFolder_1\11.log (on a Device 1)
C:\Program Files\Application\DataFolder_1\11.log (on a Device 2)
C:\Program Files\Application\DataFolder_1\12.log (on a Device 2)
C:\Program Files\Application\DataFolder_1\13.log (on a Device 2)
C:\Program Files\Application\DataFolder_2\second.db (on a Device 2)
C:\Program Files\Application\DataFolder_2\20.log (on a Device 2)
C:\Program Files\Application\DataFolder_2\21.log (on a Device 2)
C:\Program Files\Application\DataFolder_2\21.log (on a Device 1)
C:\Program Files\Application\DataFolder_2\22.log (on a Device 1)
C:\Program Files\Application\DataFolder_2\23.log (on a Device 1)

For clarity, related logs and databases are grouped together in the example above.

At 502, a name is generated for each object in the set of objects, wherein the generated names are unique across the set of objects. In some embodiments, step 502 includes adding the name of the device on which an object is located. To continue the above example, one example set of names generated at 502 are:

Device_1\C:\Program Files\Application\DataFolder_1\first.db
Device_1\C:\Program Files\Application\DataFolder_1\10.log
Device_1\C:\Program Files\Application\DataFolder_1\11.log
Device_2\C:\Program Files\Application\DataFolder_1\11.log
Device_2\C:\Program Files\Application\DataFolder_1\12.log
Device_2\C:\Program Files\Application\DataFolder_1\13.log
Device_2\C:\Program Files\Application\DataFolder_2\second.db
Device_2\C:\Program Files\Application\DataFolder_2\20.log
Device_2\C:\Program Files\Application\DataFolder_2\21.log
Device_1 \C:\Program Files\Application\DataFolder_2\21.log
Device_1 \C:\Program Files\Application\DataFolder_2\22.log
Device_1 \C:\Program Files\Application\DataFolder_2\23.log In the first group of files, inclusion of the device name (i.e., Device_1 or Device_2) uniquifies the names of the two logs named 11.log. Similarly, inclusion of the device name has uniquified the names of the two logs named 21.log.

The generated names are output at 504. Since all of the names are unique, the backup process will not fail or output an error because of name collision.

The exemplary process of FIG. 5 processes all names in a set of objects without first identifying which objects have names which would collide. In some applications this is desirable because it is faster to process all names without first identifying objects which would collide. In some applications, processing all names (e.g., as opposed to just those which would collide) is desirable because then all names have the same format, even those not in danger of name collision. For example, in embodiments where the device name is added to the path/name, it may be desirable to include device name in the path of every object (and not just those which would collide) because knowing the device may be helpful later on, for example during debugging.

Alternatively, in some embodiments, a uniquification process may first identify objects which have names which would collide and modifies only those names. For example, in some systems, it may be preferable to minimize the number of names which are changed. In such systems, a uniquification process which identifies potential name collisions and only modifies those identified objects/names may be preferred. Any appropriate uniquification technique may be used.

Figure 6:
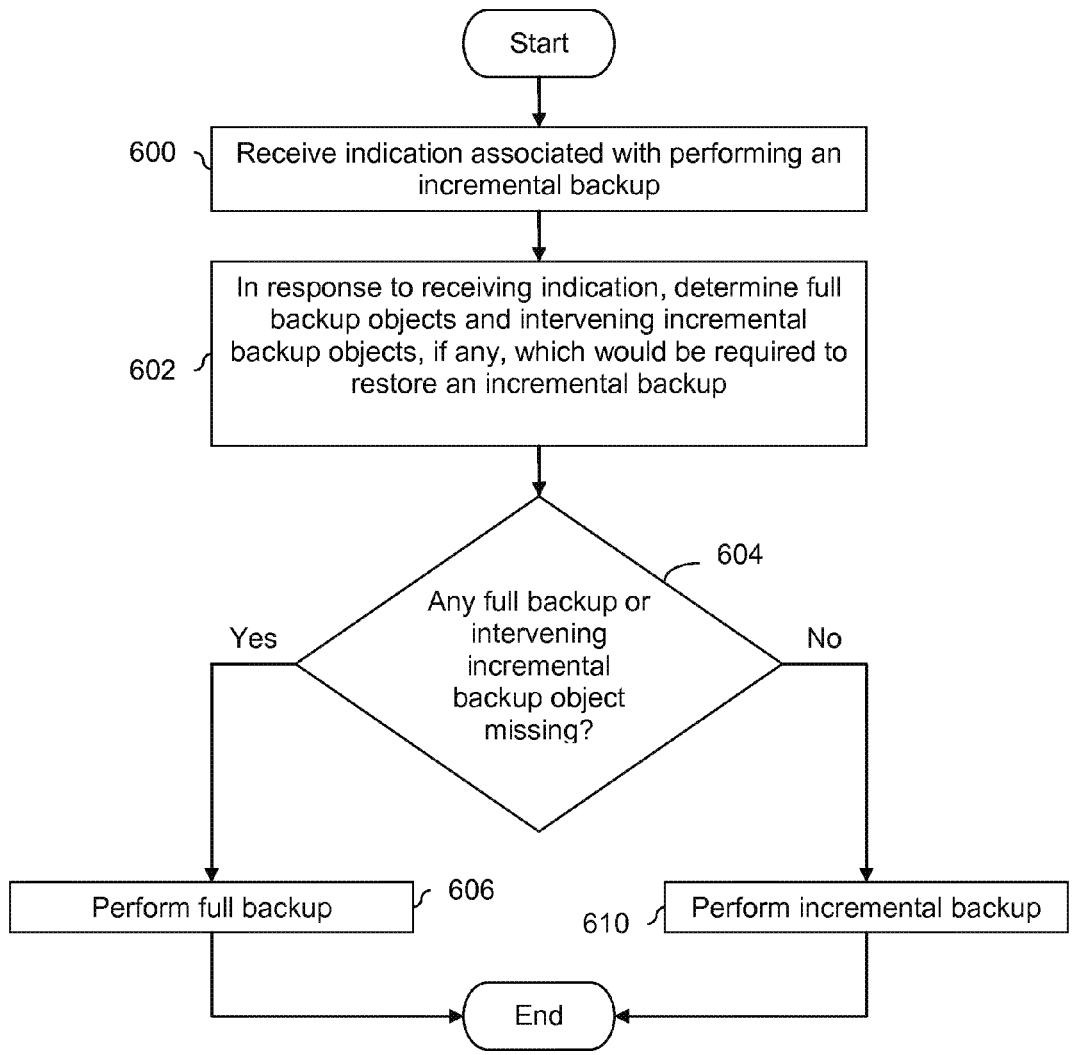
FIG. 6 is a flowchart illustrating an embodiment of a process for checking a chain of backups.

FIG. 6 is a flowchart illustrating an embodiment of a process for checking a chain of backups. The example process shown is optional and may be performed (if desired) prior to the example process shown in FIG. 2. At 600, an indication associated with performing an incremental backup is received. In response to received the indication, full backup objects and intervening incremental backup objects, if any, which would be required to restore an incremental backup (e.g., contemplated and/or yet-to-be-performed) are determined at 602. For example, in FIGS. 3A-3C, metadata 332 or objects records 372 may be used since they contain complete list of full backup objects and intervening incremental backup objects which would be required to restore a current incremental backup.

It is determined at 604 if any full backup or intervening incremental backup object is missing. In some embodiments, the determination at 604 includes checking stored or backed up objects on a backup process. For example, a full backup object or intervening incremental backup object may no longer exist on a protected device (e.g., because it was deleted by a user or application on the protected device) or it does not exist in a desired form or version (e.g., because it was modified by a user or application on the protected device after a related backup).

If any object is determined to be missing at 604, a full backup is performed at 606 (e.g., even though it is contrary to the indication received at 600). For example, step 606 may include determining a set of objects (e.g., logs and/or databases) to use in a backup, where all of the objects currently exist on the protected device. In this process, if any full backup object or intervening incremental backup object which would be needed to restore the contemplated incremental backup is not available, a full backup is performed because obeying an incremental backup indication received at 600 is useless if any of the objects is not available. If it is determined at 604 that all objects are available, an incremental backup is performed at 610. For example, the incremental backup process shown in FIG. 2 may be performed.

In the example shown herein, a chain of backups in neither determined nor crawled. The exemplary process does not care what particular backup a given object is associated with—it just wants to know if it is available or not. In some embodiments, this makes managing metadata and/or records easier and/or consumes less storage (e.g., because the metadata and/or records only need to track the objects, not a chain of backups or which backup a given object is associated with). In some embodiments, the process shown in FIG. 6 is faster than a related process which iteratively crawls up/down a chain of backups and checks objects at each backup in the chain. There may, for example, be redundant or duplicate objects checked when crawling a chain of backups.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
performing, at a full backup time, a full backup of a protected device, including by:
generating a full backup object associated with the full backup; and
setting a stored timestamp, in a collection of object records on a backup processor, associated with the full backup object to be the full backup time;
performing, at an incremental backup time which is later than the full backup time, an incremental backup of the protected device, including by:
determining a set of objects associated with the incremental backup, wherein the set of objects includes the full backup object associated with the full backup from which the incremental backup depends; and
using the backup processor to change, in the collection of object records on the backup processor, the stored timestamp associated with the full backup object from (1) the full backup time to (2) the incremental backup time;
after the incremental backup is performed, deciding whether the full backup object is eligible for deletion, including by:
taking a difference between (1) a current time and (2) the stored timestamp in the collection of object records; and
if the difference is greater than a threshold, declaring the full backup object to be eligible for deletion, wherein the change to the stored timestamp causes deletion of the full backup object by the backup processor to be delayed, which in turn extends the period during which the incremental backup can be restored; and
performing, at a second incremental backup time which is later than the incremental backup time, a second incremental backup of the protected device, including by:
determining a second set of objects associated with the second incremental backup, wherein the second set of objects includes (1) the full backup object associated with the full backup from which the second incremental backup depends and (2) an incremental backup object, other than the full backup object, associated with the incremental backup from which the second incremental backup depends;
using the backup processor to change, in the collection of object records on the backup processor, the stored timestamp associated with the full backup object from (1) the incremental backup time to (2) the second incremental backup time; and
using the backup processor to change, in the collection of object records on the backup processor, a second stored timestamp associated with the incremental backup object from (1) the incremental backup time to (2) the second incremental backup time.

2. The method of claim 1, wherein:
the protected device is part of a federated system, wherein a plurality of files having the same name on different devices is permitted by the federated system; and
determining includes using a primary node in the federated system to generate a name for each object in the set of objects, wherein the generated names are unique across the set of objects.

3. The method of claim 2, wherein generating includes adding a name of a device on which a given object resides.

4. The method of claim 1 further comprising:
receiving an indication associated with performing the second incremental backup;
determining if either (1) the full backup object or (2) the incremental backup object which would be required to restore the second incremental backup are missing; and
in the event it is determined that either (1) the full backup object or (2) the incremental backup object are missing, performing a full backup contrary to the received indication associated with performing the second incremental backup, wherein the second incremental backup is performed in the event it is determined that neither (1) the full backup object nor (2) the incremental backup object is missing.

5. The method of claim 1, wherein the determination of the set of objects is performed by an agent running on the protected device.

6. A system, comprising:
a backup agent running on a protected device, wherein the backup agent is configured to:

generate a full backup object associated with a full backup as part of performing, at a full backup time, the full backup of the protected device;

determine a set of objects associated with an incremental backup as part of performing, at an incremental backup time which is later than the full backup time, the incremental backup of the protected device, wherein the set of objects includes the full backup object associated with the full backup from which the incremental backup depends; and determine a second set of objects associated with a second incremental backup as part of performing, at a second incremental backup time which is later than the incremental backup time, the second incremental backup of the protected device, wherein the second set of objects includes (1) the full backup object associated with the full backup from which the second incremental backup depends and (2) an incremental backup object, other than the full backup object, associated with the incremental backup from which the second incremental backup depends; and a backup processor configured to:

set a stored timestamp, in a collection of object records on the backup processor, associated with the full backup object to be the full backup time as part of performing, at the full backup time, the full backup;

change, in the collection of object records on the backup processor, the stored timestamp associated with the full backup object from (1) the full backup time to (2) the incremental backup time as part of performing the incremental backup;

after the incremental backup is performed, decide whether the full backup object is eligible for deletion, including by:

taking a difference between (1) a current time and (2) the stored timestamp in the collection of object records; and if the difference is greater than a threshold, declaring the full backup object to be eligible for deletion, wherein the change to the stored timestamp causes deletion of the full backup object by the backup processor to be delayed, which in turn extends the period during which the incremental backup can be restored;

change, in the collection of object records on the backup processor, the stored timestamp associated with the full backup object from (1) the incremental backup time to (2) the second incremental backup time as part of performing the second incremental backup; and change, in the collection of object records on the backup processor, a second stored timestamp associated with the incremental backup object from (1) the incremental backup time to (2) the second incremental backup time.

7. The system of claim 6, wherein:

the protected device is part of a federated system, wherein a plurality of files having the same name on different devices is permitted by the federated system; and the backup agent is part of a primary node in the federated system and is configured determine, including by: generating a name for each object in the set of objects, wherein the generated names are unique across the set of objects.

8. The system of claim 7, wherein the backup agent is configured to generate a name for each object in the set of objects, including by: adding a name of a device on which a given object resides.

9. The system of claim 6, wherein the backup agent is further configured to:

receiving an indication associated with performing the second incremental backup;

determining if either (1) the full backup object or (2) the incremental backup object which would be required to restore the second incremental backup are missing; and in the event it is determined that either (1) the full backup object or (2) the incremental backup object are missing, performing a full backup contrary to the received indication associated with performing the second incremental backup, wherein the second incremental backup is performed in the event it is determined that neither (1) the full backup object nor (2) the incremental backup object is missing.

10. A computer program product, the computer program product being embodied in a non-transitory computer readable storage medium and comprising computer instructions for:

performing, at a full backup time, a full backup of a protected device, including by:

generating a full backup object associated with the full backup; and setting a stored timestamp, in a collection of object records on a backup processor, associated with the full backup object to be the full backup time;

performing, at an incremental backup time which is later than the full backup time, an incremental backup of the protected device, including by:

determining a set of objects associated with the incremental backup, wherein the set of objects includes the full backup object associated with the full backup from which the incremental backup depends; and changing, in the collection of object records on the backup processor, the stored timestamp associated with the full backup object from (1) the full backup time to (2) the incremental backup time;

after the incremental backup is performed, deciding whether the full backup object is eligible for deletion, including by:

taking a difference between (1) a current time and (2) the stored timestamp in the collection of object records; and if the difference is greater than a threshold, declaring the full backup object to be eligible for deletion, wherein the change to the stored timestamp causes deletion of the full backup object by the backup processor to be delayed, which in turn extends the period during which the incremental backup can be restored; and performing, at a second incremental backup time which is later than the incremental backup time, a second incremental backup of the protected device, including by:

determining a second set of objects associated with the second incremental backup, wherein the second set of objects includes (1) the full backup object associated with the full backup from which the second incremental backup depends and (2) an incremental backup object, other than the full backup object, associated with the incremental backup from which the second incremental backup depends;

using the backup processor to change, in the collection of object records on the backup processor, the stored timestamp associated with the full backup object from (1) the incremental backup time to (2) the second incremental backup time; and using the backup processor to change, in the collection of object records on the backup processor, a second stored timestamp associated with the incremental backup object from (1) the incremental backup time to (2) the second incremental backup time.

11. The computer program product of claim 10, wherein:
the protected device is part of a federated system, wherein a plurality of files having the same name on different devices is permitted by the federated system; and
the computer instructions for determining include computer instructions for generating, at a primary node in the federated system, a name for each object in the set of objects, wherein the generated names are unique across the set of objects.

12. The computer program product of claim 11, wherein the computer instructions for generating a name for each object in the set of objects include computer instructions for adding a name of a device on which a given object resides.

13. The computer program product of claim 10 further comprising computer instructions for:

receiving an indication associated with performing the second incremental backup;
determining either (1) the of full backup object or (2) the incremental backup object which would be required to restore the second incremental backup are missing; and
in the event it is determined that either (1) the full backup object or (2) the incremental backup object are missing, performing a full backup contrary to the received indication associated with performing the second incremental backup, wherein the computer instructions for the second incremental backup are performed in the event it is determined that neither (1) the full backup object nor (2) the incremental backup object is missing.

14. The computer program product of claim 10, wherein the computer instructions for determining the set of objects are performed by an agent running on the protected device.

* * * * *